April 25, 1933.  A. O. DANDINI  1,905,345
MARINE VESSEL
Filed March 1, 1932   2 Sheets-Sheet 1

INVENTOR.
ALESSANDRO O. DANDINI.
BY
ATTORNEY

April 25, 1933.  A. O. DANDINI  1,905,345
MARINE VESSEL
Filed March 1, 1932   2 Sheets-Sheet 2

INVENTOR.
ALESSANDRO O. DANDINI.
BY
ATTORNEY

Patented Apr. 25, 1933

1,905,345

UNITED STATES PATENT OFFICE

ALESSANDRO O. DANDINI, OF SAN FRANCISCO, CALIFORNIA

MARINE VESSEL

Application filed March 1, 1932. Serial No. 596,013.

This invention relates to marine vessels, and more particularly to that type of marine vessel having a revolving supporting surface.

Marine vessels are for the most part of three general classifications, namely, commercial, naval and sport. The naval and commercial vessels are necessarily large and bulky, and are subjected to great resistance by the water when under way, especially as the depth of draft increases. This limits the practical speed of such vessels to such an extent that they are becoming more and more undesirable, because of the time required between points of long distances. The small or sport vessels have, in recent years, been developed to a point where considerable speed has been obtained, but such vessels fall short of any commercial or naval value because of lack of capacity for carrying passengers or a pay load.

It is one object of this invention to provide a marine vessel that shall overcome the above difficulties.

Another object is to provide a novel marine vessel having sufficient capacity to accommodate a pay load, and which shall be practical for high speed operation.

Another object is to provide a marine vessel having the above characteristics, that shall be novel, simple in structure and comparatively cheap to build.

Another object is to provide a marine vessel having the above characteristics that shall operate to reduce the volume of water displaced by the vessel as the speed of the vessel is increased.

Another object is to provide in a marine vessel, a revolving supporting surface having ship propelling machinery disposed therewithin and a passenger or cargo cabin supported by but removed from the revolving surface.

A further object is to provide a marine vessel having the above characteristics, that shall be accelerated over the surface of the water by means of a revolving supporting surface having fins thereon and propellers associated with the air.

A still further object is to provide a marine vessel having a rotating spherical surface and a passenger or cargo carrying cabin removed from and supported in pivotal relation with the spherical surface.

The above and other objects will be apparent throughout the further description of the invention when taken in connection with the accompanying drawings, wherein like references refer to like parts. It is to be specifically understood that the drawings are not a definition of the invention, this being defined by the appended claims.

In the drawings:—

Figure 1:
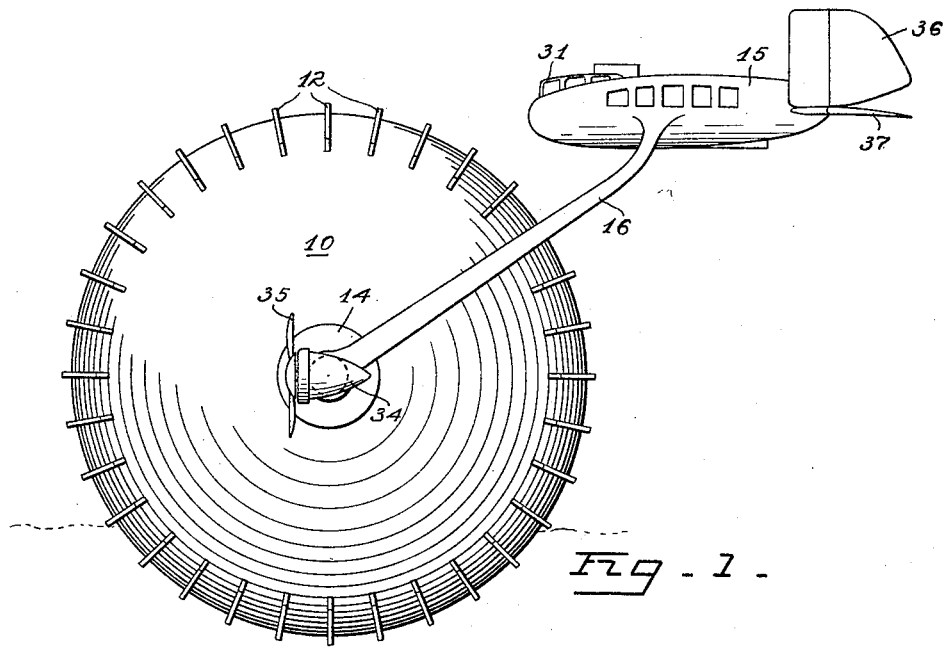
Fig. 1 is a side elevational view of one form of a marine vessel embodying the invention.
Figure 2:
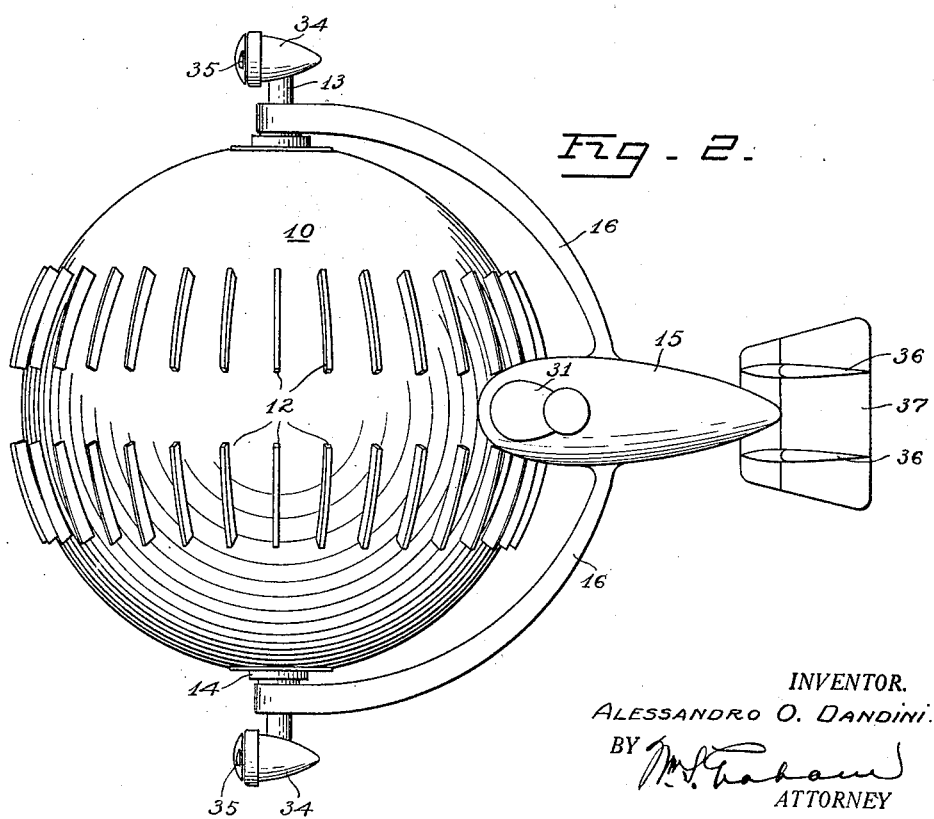
Fig. 2 is a top plan view of Fig. 1.
Figure 3:
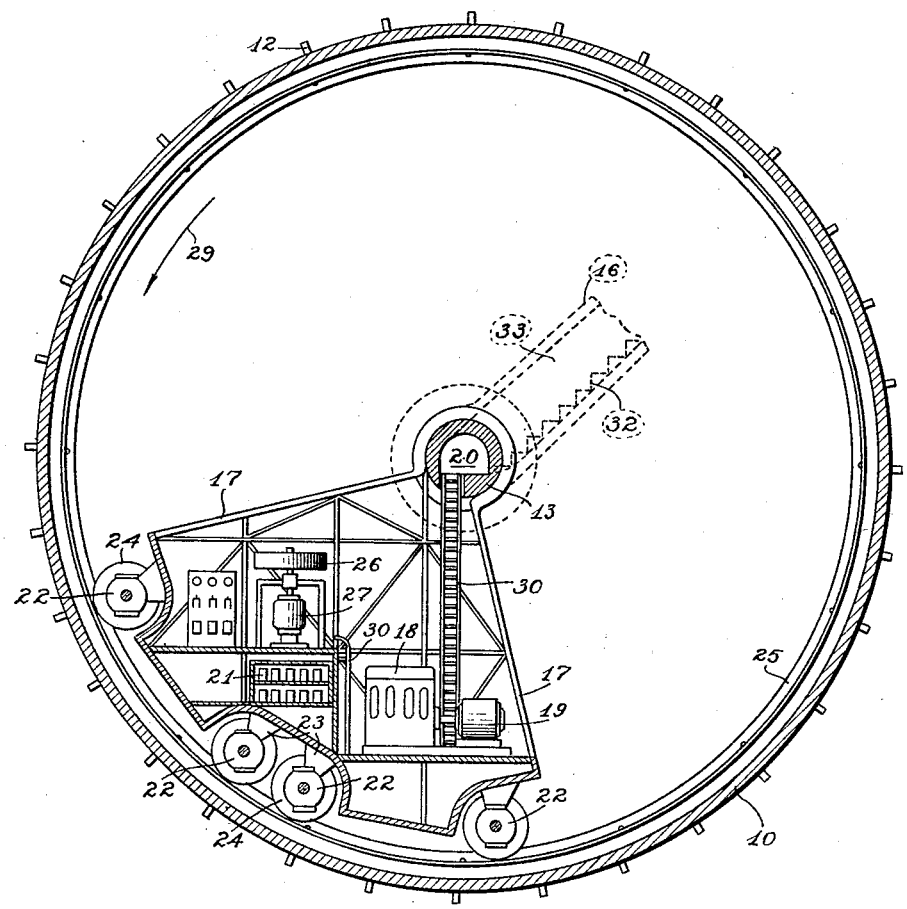
Fig. 3 is a longitudinal sectional view of the sphere shown in Figs. 1 and 2.

In the drawings, 10 indicates a spherical supporting surface made up of any suitable material, such as steel plates, and having a series of fins or paddles 12 disposed on its outer surface for contacting with the water, for conventional purposes. The sphere is provided with a hollow shaft 13 which is disposed through its horizontal poles. The shaft 13 is turnably mounted in the poles by means of any suitable water-proof bearings 14. A passenger carrying, or cargo cabin 15 is mounted above the sphere by means of a yoke or Y-shaped support 16. The upper ends of the support 16 are rigidly fixed to the cabin 15, and the lower ends of the support 16 are rigidly fixed to the hollow shaft 13 adjacent the respective ends of said shaft.

Mounted within the sphere is a frame 17 which is also rigidly fixed to the shaft 13 and adapted to support the ship propelling mechanism.

The form of ship propelling machinery here shown comprises a Diesel engine 18 adapted to drive an electric generator 19 for charging a storage battery 21, the latter being employed to furnish electricity for operating electric motors 22 carried by trucks 23 for operating the wheels 24, the latter being adapted to cooperate with a pair of annular tracks 25, which are spaced apart and rigidly fixed to the inner surface of the sphere 10. A gyroscope 26 is also provided within the sphere and carried by the frame 17 for assisting in the stability of the vessel. A motor 27 is also provided for operating the gyroscope 26.

It is to be understood that any form of power, such as gasoline, air or steam may be employed as a source of power for operating the several devices; electric power being illustrated here merely for the sake of simplicity.

It can be seen that since the cabin 15 and the frame 17 are both rigidly fixed with the hollow shaft 13, the latter being turnably mounted in the horizontal poles of the sphere 10, that both the cabin and frame 17 are pivotally mounted with respect to the sphere 10. Therefore, it follows that the cooperation of the wheels 24 with the track 25 will tend to displace the frame and the apparatus carried thereby, which will effect the rotation of the sphere and consequently the propulsion of the vessel. The direction of rotation of the sphere is indicated by the arrow 29.

The cabin is provided with a forward compartment 31 to accommodate the ship operators, and a plurality of other compartments for accommodating passengers, cargo, stores and the like, it being understood that the cabin compartments may be utilized for any purpose desired, such as war apparatus, passengers, or for carrying a pay load.

Access is had from the cabin 15 to the ship machinery, located within the sphere, by means of a passageway 33 disposed in the support 16, passageway 20 in the hollow shaft and the several stairways 30 carried by the frame 17. In the form shown, steps 32 are provided in the passageway 33. However, any practical form of transport device may be utilized between the cabin 15 and sphere 10, such as elevators, cars operated by cable or the like.

Each end of the hollow shaft 13 is further provided with an electric motor 34 also operated by the storage battery 21 and adapted to drive a propeller 35, the propellers 35 being utilized to assist in the maneuvering and propulsion of the vessel.

Any suitable controls, not shown, may be employed for operating the several motors.

Means are provided for steering the vessel, which consists of a pair of rudders 36 mounted at the rear of the cabin 15 and elevators 37 for adjusting the stability of the cabin. The motors 34 together with the propellers 35 may also be utilized for guiding or steering the ship from left to right, by means of selectively operating said motors.

Some of the important features of the invention are the use of a Diesel engine for developing electric power, and thereby decreasing the hazard of fire, the rotation of the sphere acting to lift itself upon the surface of the water and decreasing the resistance of the sphere with the water as the revolution of the sphere increases; the mounting of the cabin above and to the rear of the sphere eliminating the annoyance of the noise of the ship's machinery to the passengers; the simple and rugged manner in which the vessel may be constructed, and the increased speed at which the vessel may be operated.

It will be understood from the above that the motor block or frame 17 remains firm and stationary with respect to the sphere by its own weight, and transmits motion to the sphere through the displacement of its own mass.

The displacement of the motor block and the movement of its own mass takes place over the tracks or guides 25 on which the wheels 22 move. The guides or tracks 25 are parallel and form two vertical hoops following the circumference of the sphere's interior and forming an endless way over which the frame 17 is projected to give velocity to the ship.

The fins or paddles 12 may be of any predetermined type and those which are successively immersed by rotation of the sphere operate to eliminate skidding of the surface of the sphere over the water. These fins or paddles are preferably disposed on the exterior of the sphere corresponding to the internal metallic tracks 25, and also operate to assist the propulsion of the vessel, and to prevent on the afterpart of the sphere the suction of water and air that may retard the movement of the ship.

The vertical equilibrium of the vessel is maintained mainly by the following three factors; the inertia produced by the rotation of the tracks 25 which act as vertical fly wheels; the weight of the frame 17, together with the elements carried thereby, which is disposed in the lower interior part of the sphere, and the gyroscope that prevents ocillation of the ship at all times.

The pivotal mounting of the frame 17 and the passenger cabin, both of which are rigidly connected to the hub or axis of the sphere, effects the displacement of the frame 17 and that of the whole ship, in an easy and graceful manner. In a stormy sea this movement greatly mitigates the effect of the waves on the sphere, as the oscillatory movement of the frame 17 acts as a balance to the passenger cabin. The same oscillatory movement acts to very materially balance the cabin during acceleration and deceleration; also the weight of the frame 17, together with the elements carried thereby, are several times the weight of the passenger cabin, and when the power is removed from the motors 22, the weight of the frame acts readily to retard the rotation of the sphere, which operation takes place smoothly and progressively.

The operation of the device is as follows:—

Since the motive unit within the sphere depends from the axel or shaft 13 and is gravitationally held at the lower portion of the sphere by its weight and of course more than balances the cabin unit, upon energizing the motors 22, and rotation of the wheels 24, the sphere is driven forward by means of the internal track 25, and the frictional grip upon the water surface is effected by the fins or paddles 12. The motors 34 with propellers 35 will assist in propelling the ship when it is underway, and by operating these side motors separately, the ship may be guided or turned around when it is standing still or moving slowly.

While only one form of the invention has been illustrated and described, and only one cabin has been shown, it will be apparent to those skilled in the art that a plurality of cabins may be employed, other changes, modifications, substitutions, addition and omission may be made without departing from the spirit and scope of the invention.

I claim:—

1. In a marine vessel, a spherical supporting surface having internal annular tracks therein, a shaft turnably mounted in the horizontal poles of said sphere having a passageway therein, a frame carried by said shaft and rigidly fixed thereto, propulsion machinery including motor trucks carried by said frame, said trucks adapted to engage and cooperate with said tracks for revolving said sphere, motor driven air propellers mounted on each end of said shaft for assisting in the maneuvering and propulsion of said vessel, a cabin removed from said sphere, and means for supporting said cabin, including a hollow support having a passageway therein, said support having its upper end rigidly fixed to said cabin and its lower end rigidly fixed to said shaft, the passageway in said support adapted to communicate with the passageway in said shaft.

2. In a marine vessel, a spherical supporting surface, a shaft mounted in the horizontal poles of said sphere on which the latter is adapted to rotate, motor driven air propellers mounted on each end of said shaft for assisting in the maneuvering and propulsion of said vessel, and motive power supported by said shaft within said spherical surface, said motive power being in fixed relation with said motor driven propellers.

3. In a marine vessel, a spherical surface adapted to rest upon and move along the surface of a body of water, a shaft mounted in the horizontal poles of said sphere on which the latter is adapted to rotate, motive power mounted within said sphere and supported by said shaft, a passenger cabin supported by said shaft and removed from said sphere, and means for steering said vessel, said means adapted to operate independently of said body of water.

4. In a marine vessel, a spherical surface adapted to be supported by a body of water, a hollow shaft mounted in the horizontal poles of said sphere on which the latter is adapted to rotate, motive power supported by said shaft within said sphere, a passenger cabin removed from said sphere and supported by said shaft, and control means for steering said vessel carried by said passenger cabin, said control means being removed therefrom and adapted to operate independently of said body of water.

5. In a marine vessel adapted to move along the surface of a body of water, a spherical supporting surface, a shaft mounted in the horizontal poles of said sphere on which the latter is adapted to rotate, motor driven air propellers mounted on each end of said shaft, motive power supported by said shaft within said sphere, said motive power adapted to rotate said sphere, and a passenger cabin supported by said shaft and removed from said sphere, said passenger cabin, motor driven air propellers and motive power being in fixed relation, one with the other.

6. In a marine vessel adapted to move along the surface of a body of water, a shaft mounted in the horizontal poles of said sphere on which the latter is adapted to rotate, motive power supported by said shaft within said sphere and adapted to rotate said sphere, a passenger cabin supported by said shaft and removed from said sphere, said passenger cabin and motive power being in balanced relation, the center of gravity of said motive power and said passenger cabin being disposed in perpendicular planes spaced apart.

7. In a marine vessel adapted to move along the surface of a body of water, a spherical supporting surface, motive power mounted within said spherical surface, motor driven air propellers mounted exterior from said supporting surface, and means for mounting said motive power and said air propellers in fixed relation, said motive power adapted to rotate said sphere and said air propellers adapted to assist the propulsion and maneuvering of said vessel, and a separate means for steering said vessel when under way, said means being removed from and independent of said body of water.

8. In a marine vessel, a spherical supporting surface, a hollow shaft turnably mounted in the horizontal poles of said sphere, motive power mounted within said sphere and supported by said shaft, a passenger cabin removed from said sphere, a hollow support fixed to said shaft and said passenger cabin, and means for communication between said cabin and said sphere, said connecting means including the hollow shaft and hollow support, and control means carried by said passenger cabin, said control means being dependent upon the surrounding air forces.

9. In a marine vessel adapted to move along the surface of a body of water, a spherical supporting surface, a shaft mounted in the horizontal poles of said sphere on which the latter is adapted to rotate, means supported by said shaft for propelling said vessel, and means supported by said shaft for controlling the direction of said vessel, said means being removed from and independent of said body of water.

In testimony whereof, I have affixed my signature.

ALESSANDRO O. DANDINI.